(12) United States Patent
Wang et al.

(10) Patent No.: US 9,058,937 B2
(45) Date of Patent: Jun. 16, 2015

(54) TOUCH PANEL

(75) Inventors: Qiang Wang, Dongguan (CN); Zhi-Hua Zeng, Dongguan (CN); Chong-Jun Li, Dongguan (CN); Bing-Quan Fan, Dongguan (CN)

(73) Assignee: Molex Incorporated, Lisle, IL (US)

( * ) Notice: Subject to any disclaimer, the term of this patent is extended or adjusted under 35 U.S.C. 154(b) by 31 days.

(21) Appl. No.: 13/466,009

(22) Filed: May 7, 2012

(65) Prior Publication Data

US 2012/0280936 A1    Nov. 8, 2012

(30) Foreign Application Priority Data

May 6, 2011   (CN) ........................... 2011 1 0121517
May 6, 2011   (CN) ........................... 2011 1 0121528
May 6, 2011   (CN) ........................... 2011 2 0149330

(51) Int. Cl.
    *G09G 5/00*     (2006.01)
    *H01H 9/18*     (2006.01)
    *G06F 3/044*     (2006.01)
    *G06F 3/041*     (2006.01)

(52) U.S. Cl.
CPC ............... *H01H 9/182* (2013.01); *G06F 3/044* (2013.01); *G06F 3/0412* (2013.01)

(58) Field of Classification Search
USPC .......................................... 345/173; 361/600
See application file for complete search history.

(56) References Cited

U.S. PATENT DOCUMENTS

| | | | |
|---|---|---|---|
| 4,264,903 A | 4/1981 | Bigelow | |
| 6,167,182 A | 12/2000 | Shinohara et al. | |
| 7,786,981 B2 * | 8/2010 | Proctor | 345/173 |
| 8,274,409 B2 * | 9/2012 | Lin et al. | 341/22 |
| 8,363,007 B2 * | 1/2013 | Shih et al. | 345/156 |
| 8,669,944 B2 | 3/2014 | Klinghult et al. | |
| 2002/0018340 A1 * | 2/2002 | Okamoto | 361/807 |
| 2005/0078057 A1 | 4/2005 | Chang et al. | |
| 2008/0080160 A1 | 4/2008 | English et al. | |
| 2008/0143681 A1 | 6/2008 | XiaoPing | |
| 2009/0096754 A1 * | 4/2009 | Hinata | 345/173 |
| 2009/0140996 A1 * | 6/2009 | Takashima et al. | 345/173 |
| 2009/0160671 A1 | 6/2009 | Shih et al. | |
| 2010/0008067 A1 * | 1/2010 | Tai et al. | 362/97.1 |
| 2010/0265193 A1 | 10/2010 | Kung et al. | |
| 2011/0069030 A1 | 3/2011 | Nozawa | |
| 2011/0095998 A1 | 4/2011 | Hsieh et al. | |

FOREIGN PATENT DOCUMENTS

| | | |
|---|---|---|
| TW | M293398 U | 7/2006 |
| TW | M343209 | 10/2008 |
| TW | M387315 | 8/2010 |

* cited by examiner

*Primary Examiner* — Grant Sitta

(57) ABSTRACT

The Present Disclosure provides a touch panel, comprising a main panel and a light-emitting touch module disposed underneath. The main panel is provided with a plurality of display patterns thereon. A light-emitting touch module includes a first circuit board provided with a plurality of touch sensors, a plurality of light-emitting devices and a plurality of light guiding parts attached to the side edges of the light-emitting devices so as to evenly project the light emitted from the light-emitting devices upward to the display patterns. The light-emitting touch module further comprises a light reflecting part disposed underneath the light guiding parts capable of reflecting the light emitted from the bottom surface of the light guiding parts back to the light guiding parts, which is further projected upward from the display patterns so as to improve the brightness of the patterns.

14 Claims, 11 Drawing Sheets

TOUCH PANEL

REFERENCE TO RELATED APPLICATIONS

The Present Disclosure claims priority to prior-filed Chinese Utility Model Patent Application No. 201120149330, entitled "Touch Panel," filed on 6 May 2011 with the State Intellectual Property Office of the People's Republic of China; Chinese Patent Application No. 201110121528.0, entitled "Touch Panel," filed on 6 May 2011 with the State Intellectual Property Office of the People's Republic of China; and Chinese Patent Application No. 201110121517.2, entitled "Touch Panel," filed on 6 May 2011 with the State Intellectual Property Office of the People's Republic of China. Additionally, the Present Disclosure is related to Taiwanese Utility Model Patent Application No. 100210368, entitled "Touch Panel," filed on 8 Jun. 2011 with the Intellectual Property Office of the Republic of China; Taiwanese Patent Application No. 10119966, entitled "Touch Panel," filed on 8 Jun. 2011 with the Intellectual Property Office of the Republic of China; and Taiwanese Patent Application No. 10119968, entitled "Touch Panel," filed on 8 Jun. 2011 with the Intellectual Property Office of the Republic of China. The content of each of the aforementioned Patent Applications are incorporated in their entireties herein.

BACKGROUND OF THE PRESENT DISCLOSURE

The Present Disclosure relates, generally, to a touch panel, and, more particularly, to a touch panel capable of improving the brightness of display patterns.

For aesthetics and easy operation, touch control has been increasingly used in control panels for existing mechanical and electrical products, i.e., panels in the mechanical and electrical products that are provided with display patterns, with capacitive or resistive touch sensors disposed underneath the panel to sense the touch positions, which are converted to corresponding electric signals and transmitted to a touch control circuit. Such touch control circuits can correspondingly control the light-emitting state of a corresponding light-emitting device, which can light up the display patterns on the panel. Such touch control circuits can further transmit a corresponding signal to a main control circuit to control the working state of the mechanical and electrical products, thereby effectively achieving human-machine interaction and improving the convenient control and operation of the mechanical and electrical products.

A touch panel display apparatus is disclosed in the Taiwanese Patent No. 97208965 (the content of which is hereby incorporated in its entirety herein), mainly comprises a touch control circuit, which is electrically connected to at least one touch sensor and a corresponding light-emitting device. The touch sensor can sense a proximate signal and transmit the same to the touch control circuit for controlling on and off of the light-emitting device. The touch panel display apparatus also comprises a main panel, formed with a light hole at the position corresponding to the light-emitting device, the light-emitting device being disposed at one side edge of the light hole. The touch panel display apparatus also comprises a name plate, provided with display patterns for the panel, and a light guiding device disposed in the light hole. When the light-emitting device emits light as a result of operations on the touch sensor, the light passes through the light guiding device and is evenly diffused in the light hole and refracted at the name plate.

According to the above-described touch panel, a part of the light emitted by the light-emitting device could diffuse inwardly from the inner surface of the light guiding device to the touch control circuit, leading to the attenuated light that reaches the display patterns. The light intensity of the light-emitting device, however, has to be increased to ensure that the display patterns have the pre-set brightness, which increases the power consumption and is harmful to energy saving and environmental protection.

SUMMARY OF THE PRESENT DISCLOSURE

The technical problem that the Present Disclosure intends to solve is to overcome the aforementioned drawbacks by providing a touch panel that can improve the brightness of the display patterns without increasing the power consumption of the light-emitting device.

In light thereof, the Present Disclosure provides a touch panel, comprising a main panel and a light-emitting touch module disposed underneath. The main panel is provided with a plurality of display patterns thereon. A light-emitting touch module includes a first circuit board provided with a plurality of touch sensors, a plurality of light-emitting devices and a plurality of light guiding parts attached to the side edges of the light-emitting devices so as to evenly project the light emitted from the light-emitting devices upward to the display patterns. The light-emitting touch module further comprises a light reflecting part disposed underneath the light guiding parts capable of reflecting the light emitted from the bottom surface of the light guiding parts back to the light guiding parts, which is further projected upward from the display patterns so as to improve the brightness of the patterns.

The light reflecting part may comprise a layer of light reflecting film printed with a light reflecting ink on the first circuit board, which is attached underneath the bottom surface of the light guiding parts. The touch sensors may be capacitive touch sensors, and the light reflecting film can be directly printed above the touch sensors. The light-emitting touch module may comprises a spacer disposed between the main panel and a first circuit board, the spacer being made of an opaque material, and holding holes that run through vertically are formed thereon spacer at positions corresponding to the display patterns on the main panel for correspondingly holding the light guiding parts. Preferably, the top surface of the light guiding parts is a rough cloudy surface, while the bottom surface thereof is a smooth surface. The light-emitting touch module may further comprise a second circuit board and a touch control circuit disposed thereon, the second circuit board being electrically connected to the first circuit board, spaced apart from the first circuit board at a distance so as to reduce the electromagnetic interference by the touch control circuit on the touch sensors. The light-emitting touch module may further comprise a display module disposed at one side of the first circuit board side by side. The second circuit board may be disposed on the bottom surface of the display module, while electronic components that form the touch control circuit are disposed on the bottom surface of the second circuit board that is away from the main panel.

The main panel may further be provided with a combined touch area and a plurality of sub-display units corresponding to the combined touch area, the sub-display units provided with corresponding display patterns. The first circuit board may be provided with a plurality of continuously arranged touch sensors correspondingly underneath the combined touch area, and provided with light-emitting devices correspondingly underneath the sub-display units. The combined touch area may be ring shaped, and the touch sensors corresponding to the combined touch area are continuously arranged on the first circuit board in the rotation direction in a tandem array. All touch sensors to which the combined touch area corresponds are capacitive touch sensors, wherein the borderline between two neighboring touch sensors is dovetail shaped.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
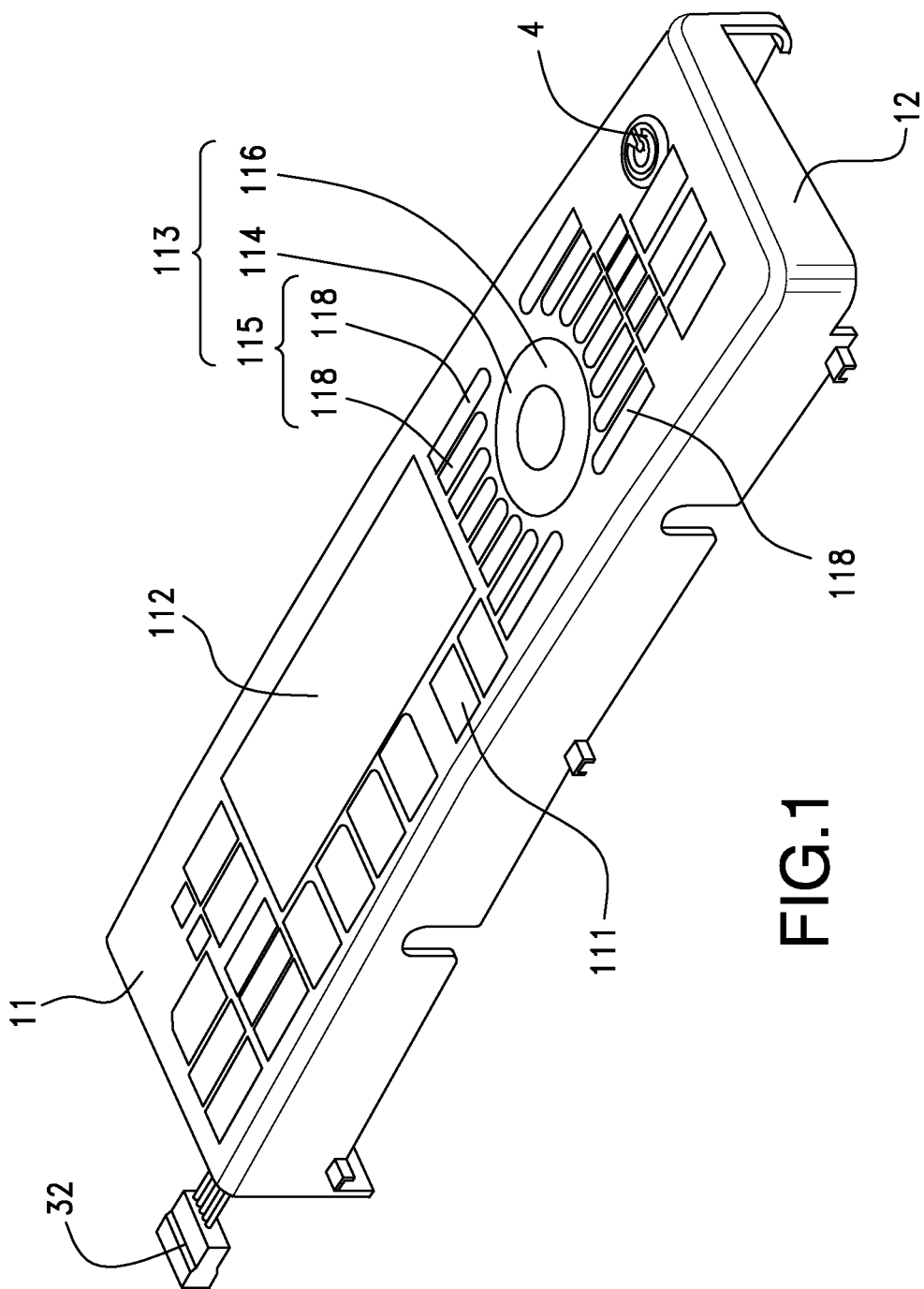
FIG. 1 is a three dimensional view of a touch panel according to the Present Disclosure.
Figure 2:
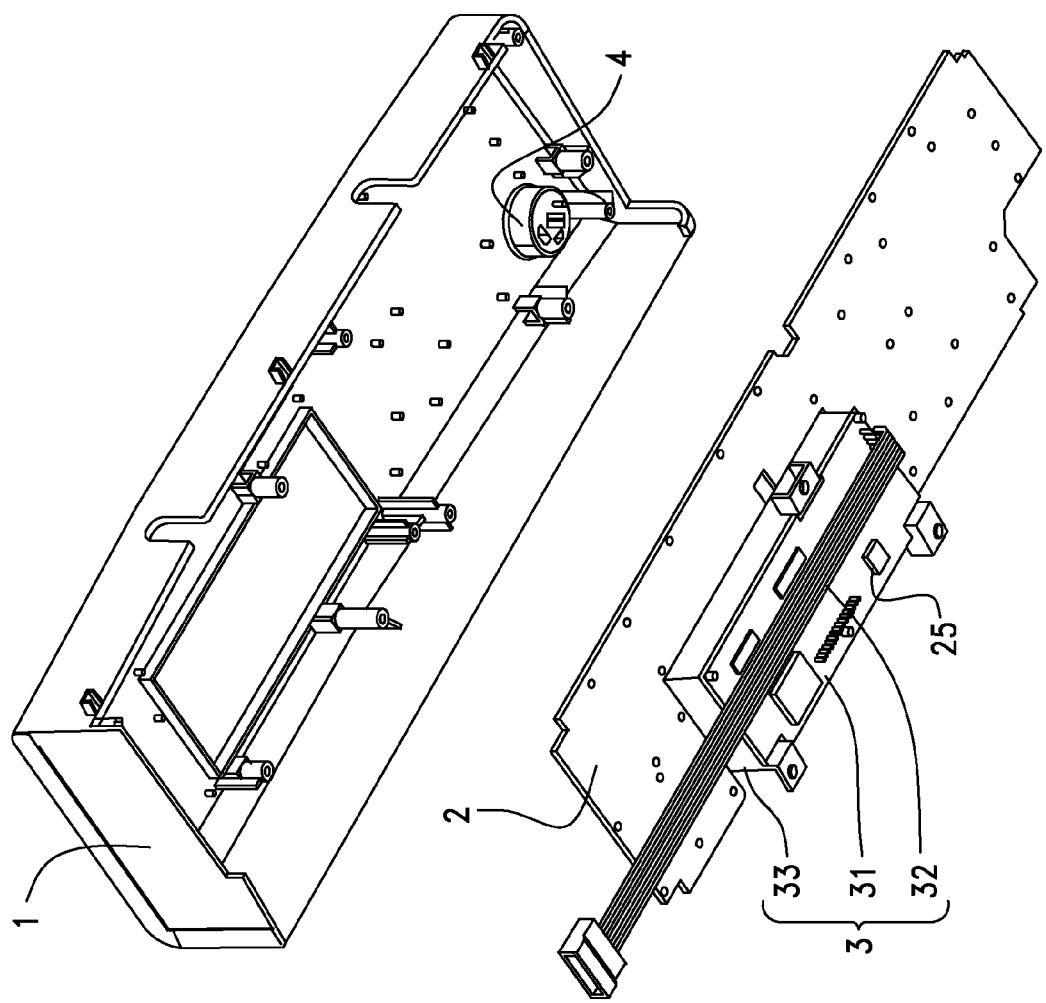
FIG. 2 is a three dimensional exploded view of the touch panel of FIG. 1.
Figure 3:
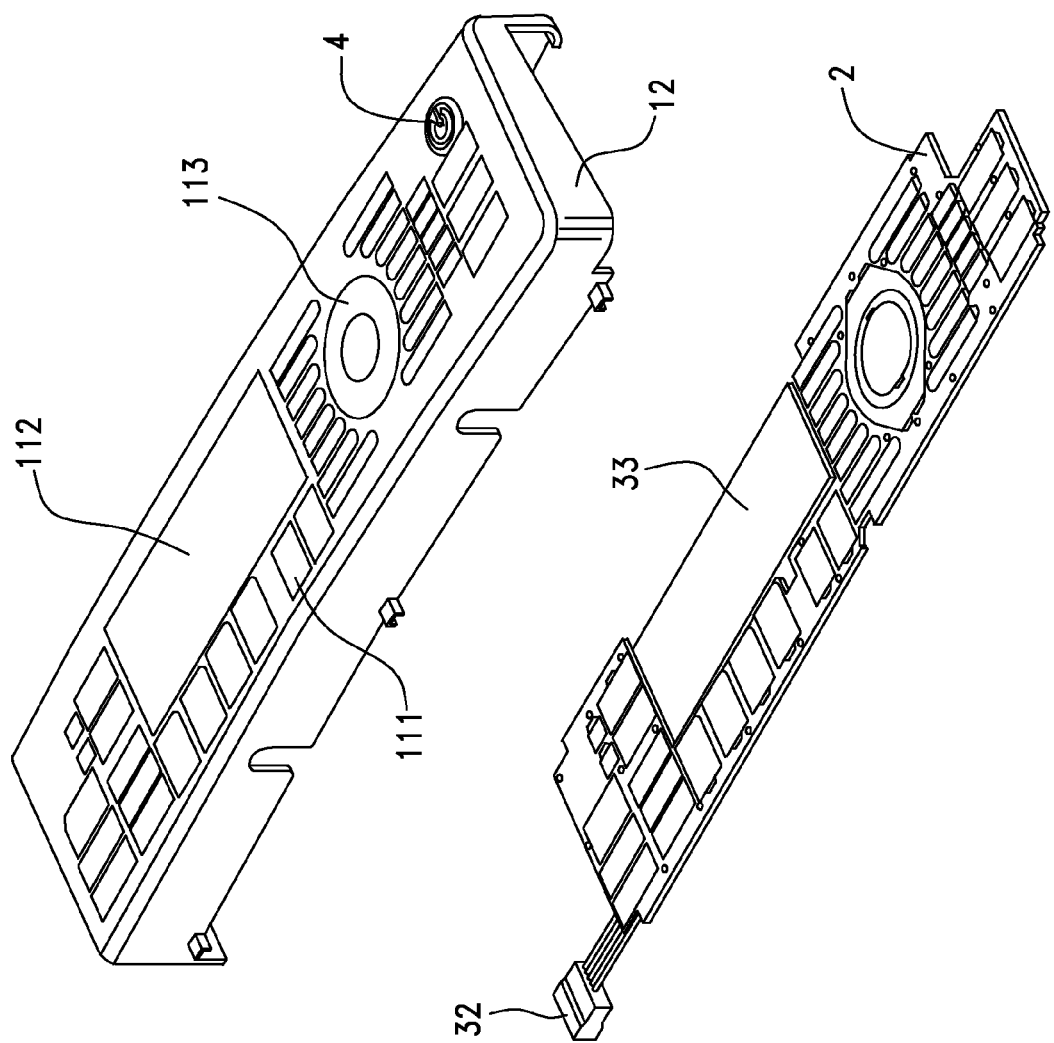
FIG. 3 is another three dimensional exploded view of the touch panel of FIG. 1.
Figure 4:
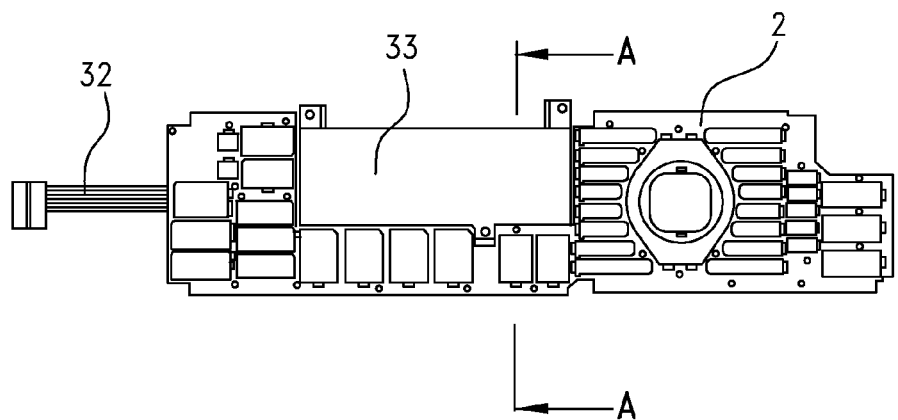
FIG. 4 is a top view of the touch panel of FIG. 1, with the main panel removed.
Figure 5:
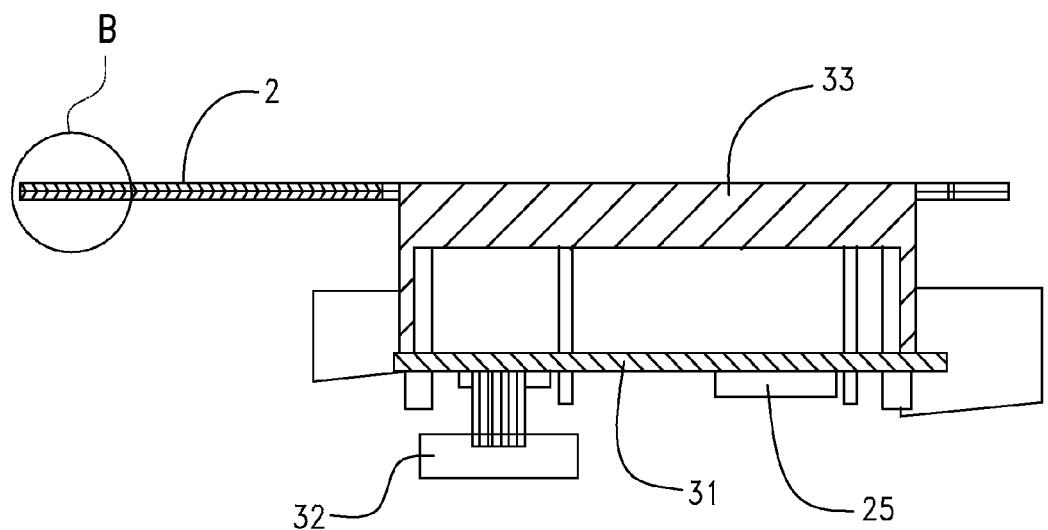
FIG. 5 is a cross sectional view along Line A-A of FIG. 4.

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

As shown in FIG. 1 to FIG. 8, the touch panel according to the Present Disclosure comprises a main panel 1, a light-emitting touch module 2 disposed underneath said main panel 1, and a power switch 4 disposed on said main panel 1. Said touch panel is provided primarily with two different types of touch display modes. The first type integrates touch and display, which is more conventional. The second type is the innovative type according to the Present Disclosure, which has a combined touch area and a corresponding combined display area.

Said main panel 1 is a transparent ABS plastic piece, which has a frame structure with an opening only at the bottom end, having a base 11 and side panels 12 extending downward peripherally from said base 11. Said light-emitting touch module 2 is contained in a chamber formed by said base 11 and the four side panels 12. Said base 11 is only formed with a hole at one corner for installing the power switch 4. When it is installed in a washer, the hole is the only aspect of said base 11 which must be water-proof and dust-proof; to prevent the light-emitting touch module 2 from being damaged.

The base 11 is provided with a plurality of first touch display areas 111 corresponding to the above first type touch mode, a display window 112 and a second touch display area 113 corresponding to the above second type touch mode.

The second touch display area 113 mainly comprises a ring-shaped combined touch area 114 and a combined display area 115 that corresponds to said combined touch area 114, said combined display area 115 comprises a plurality of sub-display units 118 disposed on two sides of said combined touch area 114, and each sub-display unit 118 is printed with a corresponding function display pattern thereon (not shown, which may correspond to one washing mode of the washer, respectively). The second touch display area 113 further comprises a touch display area for function execution 116 disposed in the center of the ring-shaped combined touch area 114.

The bottom surface of the base 11 is printed with a layer of an opaque ink on positions that do not need to transmit light, while a layer of a transparent ink is printed on positions that need to transmit light, for example: the back of the first touch display areas 111 and the display pattern formed by characters and/or images on sub-display units 118 in the combined display area 115, thereby forming transparent windows, when there is no light, said display patterns appear to be black, and when there is light transmitted from the back of the transparent windows, the display patterns are visible.

Said light-emitting touch module 2 comprises a first circuit board 21, a number of light guiding parts 22, a number of light reflecting parts 23, a spacer 24, a main circuit module 3, and a touch control circuit 25 disposed on said main circuit module 3. Refer to FIG. 4 to FIG. 8, a first touch sensor 211 and a first light-emitting device 212 are disposed on the top surface of the first circuit board 21 correspondingly underneath the first touch display areas 111 of the main panel 1. A notch 213 is further formed on one side of the first circuit board 21.

Figure 9:
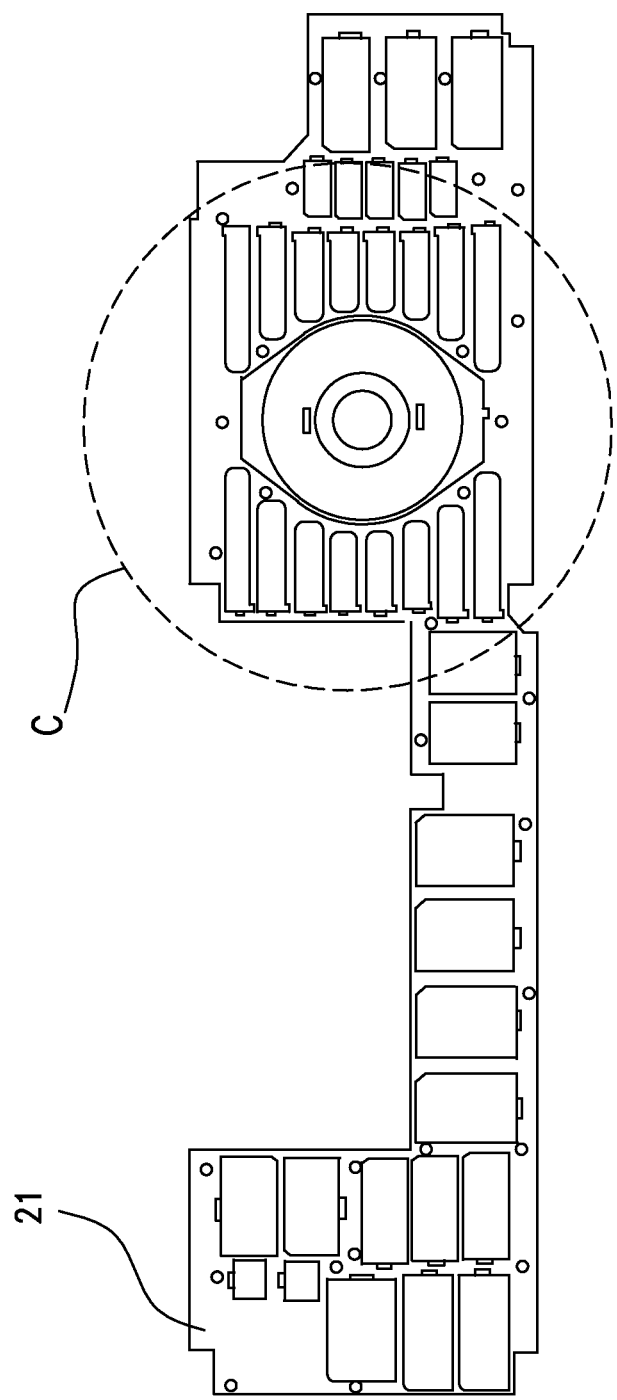
FIG. 9 is a top view of the first circuit board of FIG. 8.
Figure 10:
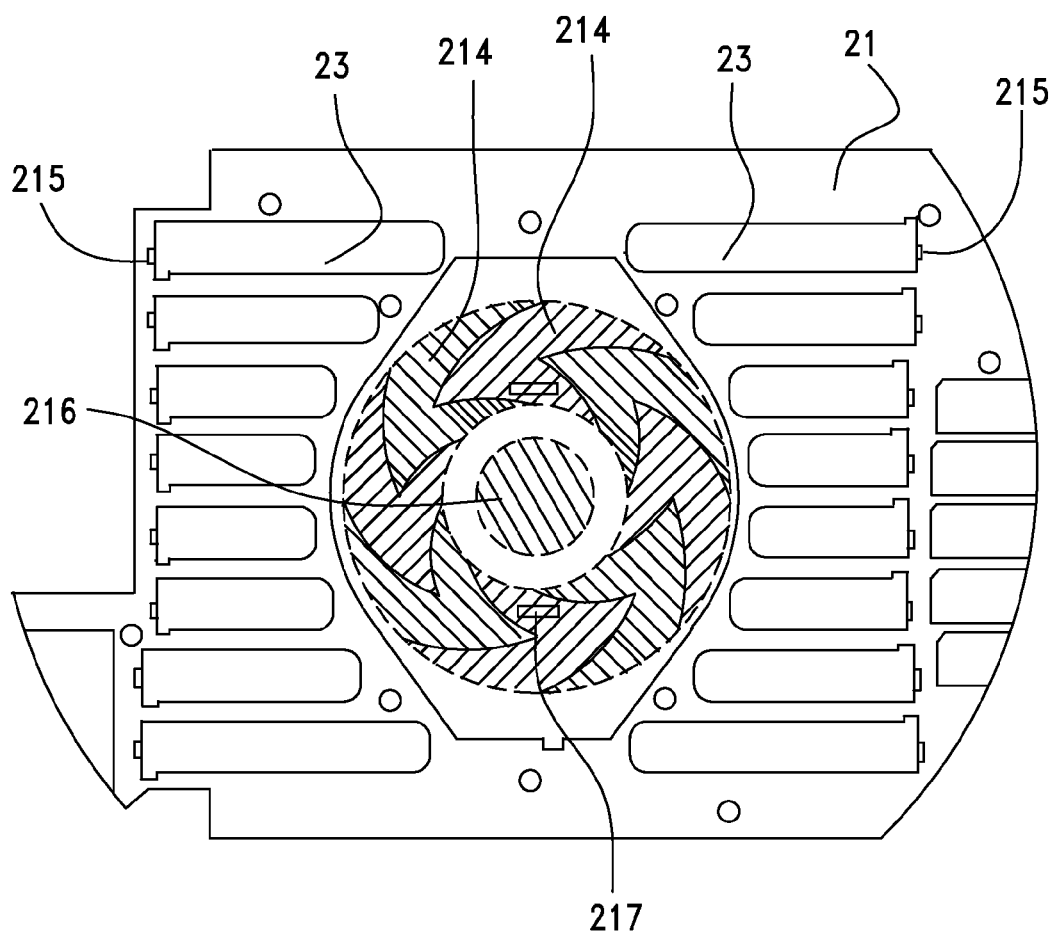
FIG. 10 is a partially enlarged view of Area C of FIG. 9, wherein the touch sensor area is partially processed in a perspective view, illustrating the physical distribution state of all sensors.

Refer to FIG. 9 and FIG. 10, the top surface of the first circuit board 21 that faces the main panel 1 is further provided with a plurality of second touch sensors 214 corresponding to the combined touch area 114 of the main panel 1, a third touch sensor 216 corresponding to the touch display area for function execution 116, a plurality of second light-emitting devices 215 corresponding to the sub-display units 118 of the combined display area 115, and two third light-emitting devices 217 corresponding to the combined touch area 114 and the touch display area for function execution 116.

In the present embodiment, the first touch sensor 211, the second touch sensors 214 and the third touch sensor 216 are all capacitive touch sensors, while in other embodiments, they may also be changed to resistive touch sensors, and these touch sensors 211, 214 and 216 may be used to sense a proximate signal of an operator (e.g. the touch by a finger). Wherein only one touch sensor is disposed correspondingly underneath each of the first touch display areas 111 and the touch display area for function execution 116; while correspondingly underneath the ring-shaped combined touch area 114 (refer to FIG. 10), a plurality of the second touch sensors 214 are continuously arranged on the front face of the first circuit board 21 in the rotation direction in a tandem array; there are a total of 8 of these second touch sensors 214, wherein the borderline between two neighboring second touch sensors 214 is dovetail shaped, and such a border structure is beneficial for reducing the signal crosstalk between two neighboring second touch sensors 214; every second touch sensor 214 is consisted of a copper foil (not shown) and electrical logic ground disposed between two borderlines. The first light-emitting device 212, the second light-emitting devices 215, and the third light-emitting devices 217 are preferably LEDs (light emitting diodes).

The light guiding parts 22 are made of PC plastic (polycarbonate), which are correspondingly disposed underneath each of the first touch display areas 111, the combined touch area 114, the combined display area 115 and the touch display area for function execution 116 of the main panel 1, wherein the top surface of said light guiding parts 22 is preferably a rough cloudy surface that is beneficial for evenly projecting light upward; while the bottom surface thereof is preferably a smooth surface that is beneficial for reducing attenuation by reducing light escaped from the bottom surface through total reflection. The side edge of said light guiding part 22 is attached to the first light-emitting device 212, the second light-emitting device 215 or the third light-emitting device 217, such that the light emitted by the first light-emitting device 212, the second light-emitting device 215 or the third light-emitting device 217 can be transmitted to a range of a certain area in parallel, which is then evenly projected upward by the cloudy surface on the top to the first touch display areas 111, the combined touch area 114, the combined display area 115 and the touch display area for function execution 116 of the main panel 1, thereby displaying the function display patterns on the main panel 1.

Figure 6:
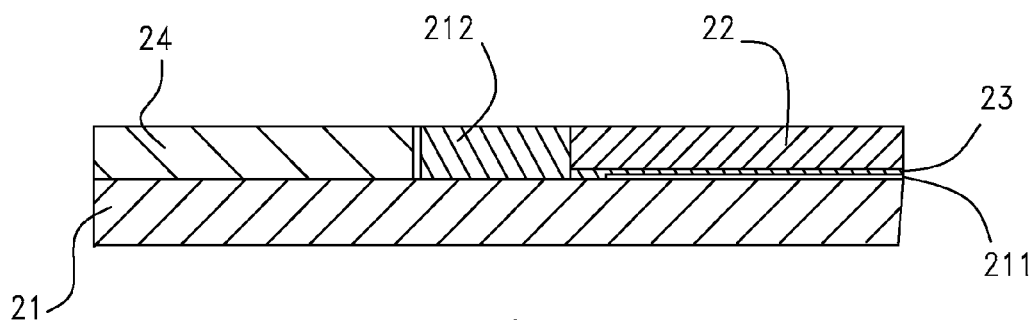
FIG. 6 is a partially enlarged view of Area B of FIG. 5.
Figure 7:
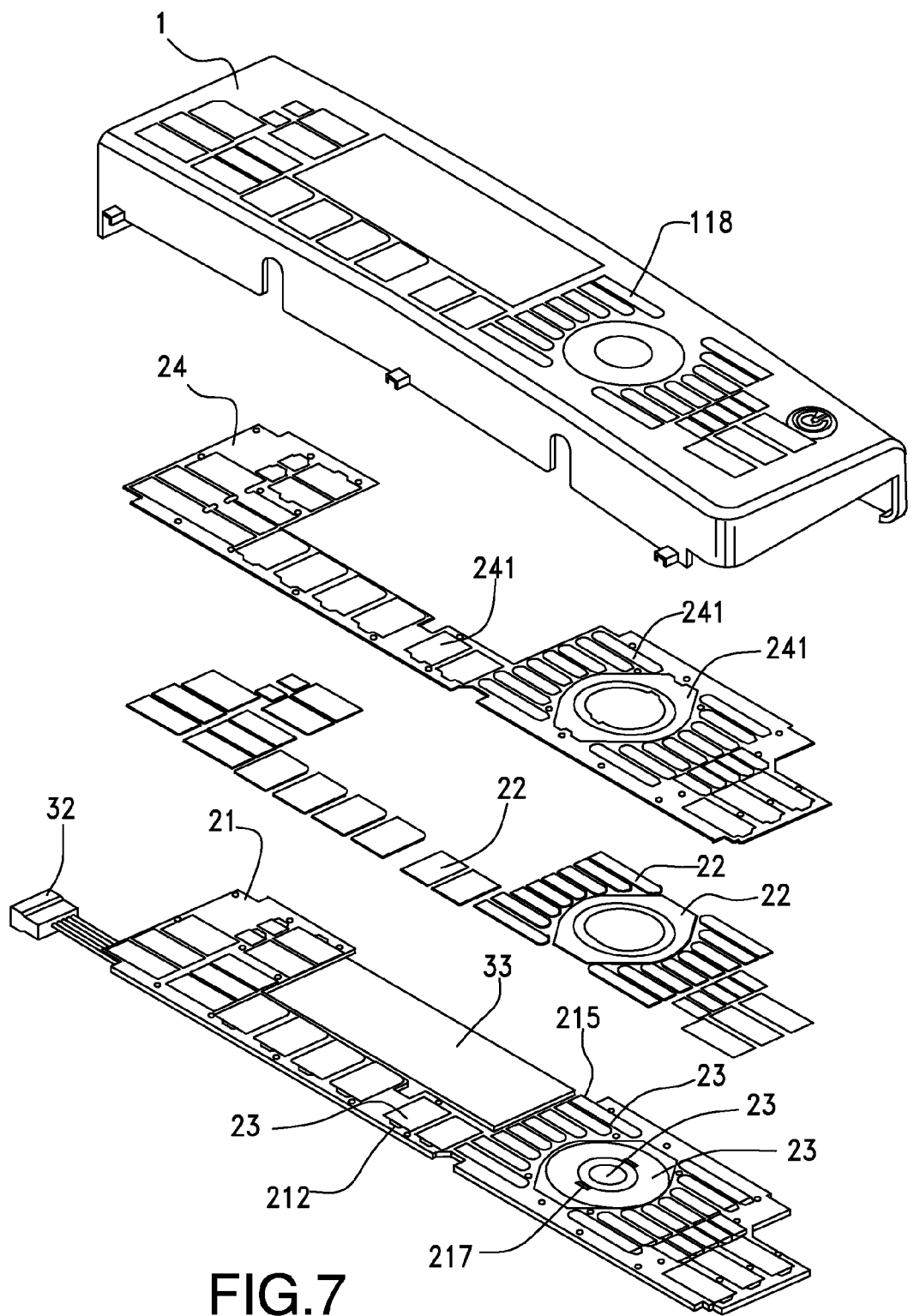
FIG. 7 is a three dimensional exploded view of the touch panel of FIG. 1.
Figure 8:
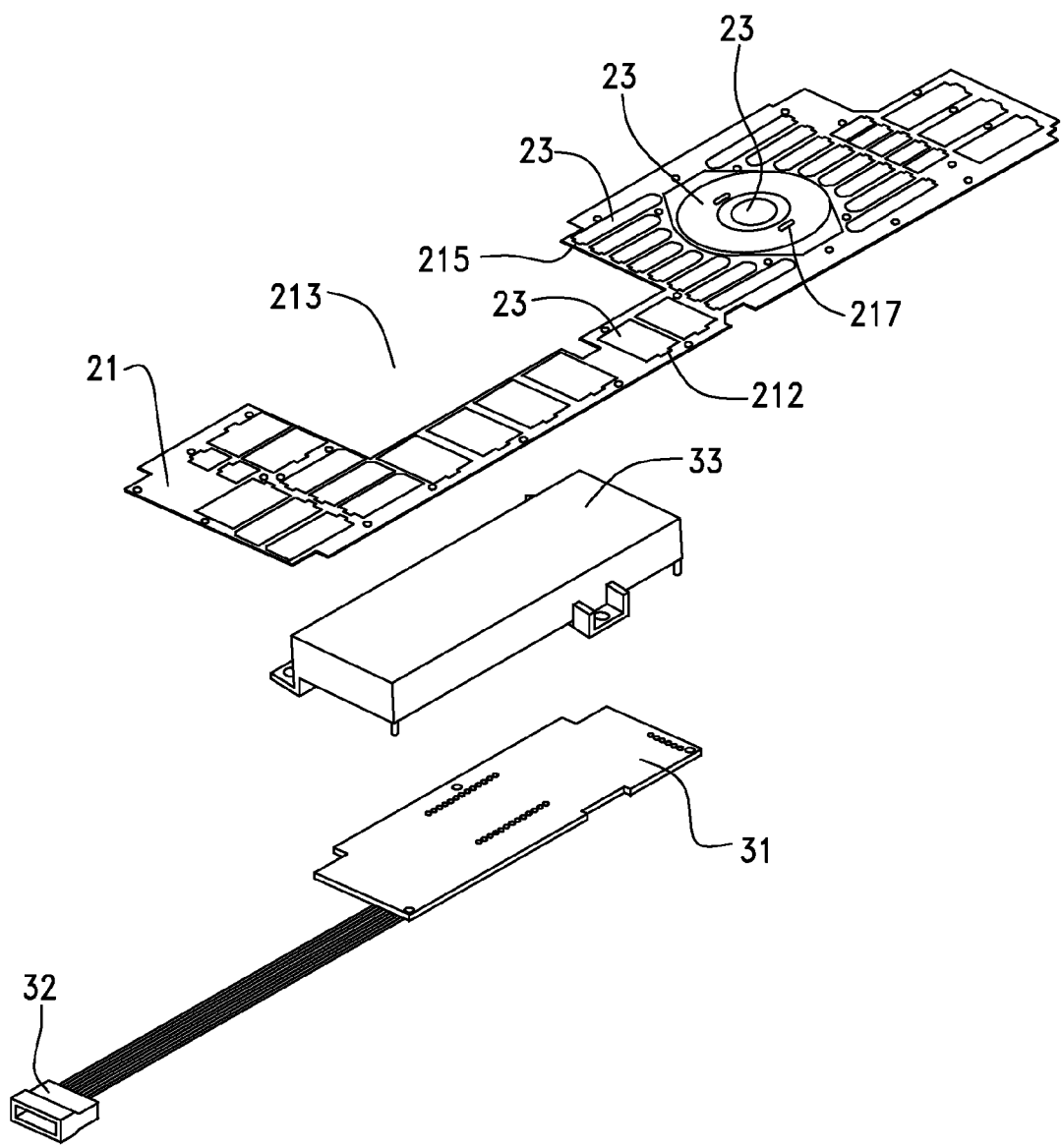
FIG. 8 is a three dimensional exploded view of a first circuit board, a display module and a second circuit board of the touch panel of FIG. 1.

The light reflecting parts 23 are disposed correspondingly underneath the light guiding parts 22, which can reflect the light diffused from the bottom surface of the light guiding parts 22 back to the top surface of the light guiding parts 22 so as to improve the brightness of the display patterns. Refer to FIG. 6, the light reflecting parts 23 are preferably a layer of light reflecting film printed with a light reflecting ink (e.g. a white ink) on said first circuit board 1, which are directly attached underneath the bottom surface of said light guiding parts 22, wherein the light reflecting parts 23 in the first touch display areas 111 and the touch display area 116 are directly printed above the first touch sensor 211 or the third touch sensor 216. Relative to regular light-reflecting structures, this light reflecting film has advantages in low cost and a light and thin structure. Through the reflection by the light reflecting parts 23 disposed underneath the light guiding parts 22, the light-emitting efficiency of the first light-emitting device 212, the second light-emitting devices 215 and the third light-emitting devices 217 can be improved, thereby increasing the brightness of the first touch display areas 111, the combined display area 115, the combined touch area 114 and the touch display area for function execution 116, achieving energy saving and environmental protection.

The spacer 24 is disposed between the base 11 of the main panel 1 and the first circuit board 21, which is made of an opaque material (e.g. black foam). Said spacer 24 is a double-sided adhesive piece, with its top surface glued to the bottom surface of the main panel 1 and its bottom surface glued to the top surface of the first circuit board 21. The spacer 24 plays a role in blocking light and positioning the light guiding parts 22, so as to effectively prevent optical crosstalk and light leakage between different display areas. A plurality of holding holes 241 that run through vertically is formed on the spacer 24 correspondingly for holding the light guiding parts 22, the first light-emitting device 212, the second light-emitting devices 215 or the third light-emitting devices 217 therein.

Figure 11:
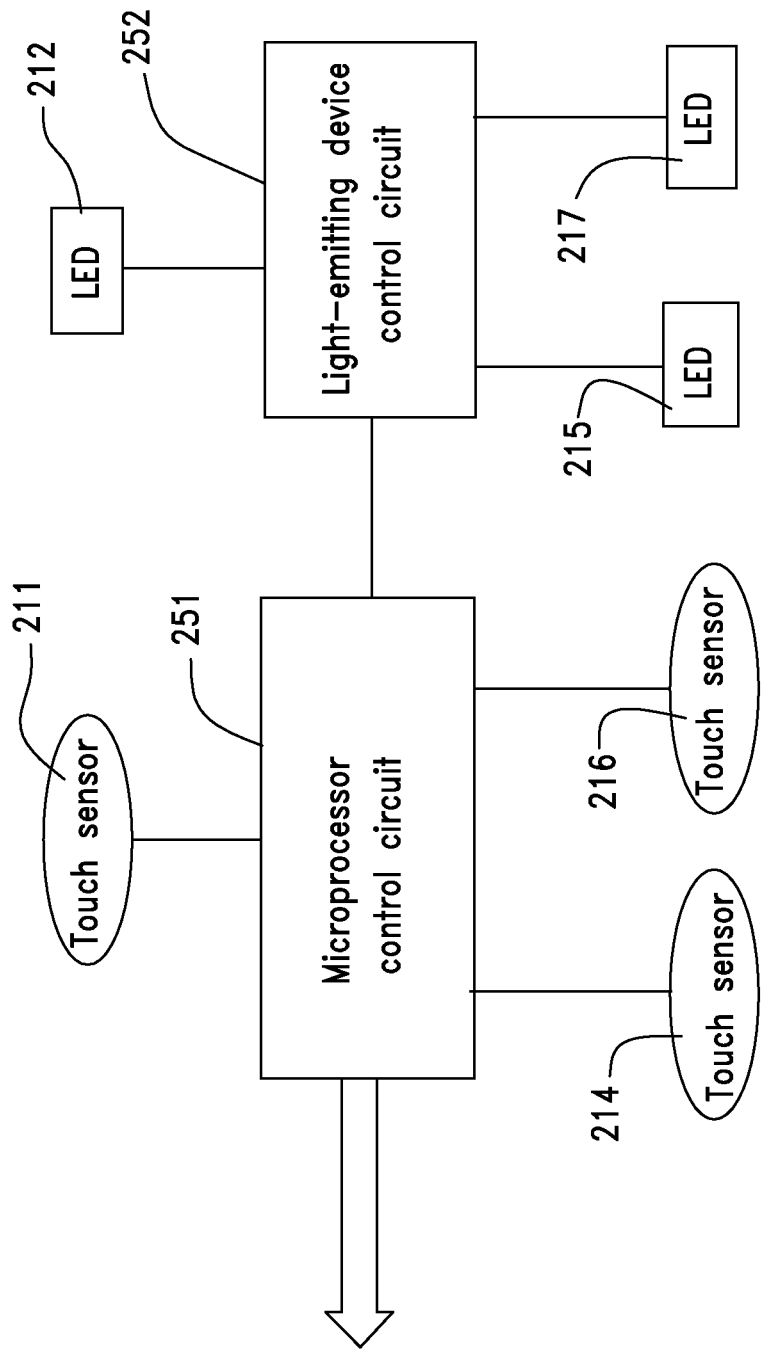
FIG. 11 is a block diagram of a touch control circuit of the touch panel of FIG. 1.

Refer to FIG. 11, the touch control circuit 25 mainly comprises a microprocessor control circuit 251 and a light-emitting device control circuit 252. Said microprocessor control circuit 251 is consisted of a power source circuit, a microprocessor and its auxiliary circuit. The microprocessor may preferably be a Model CY8C22545 single-chip computer. Said light-emitting device control circuit 252 may further be consisted of a shift register, a light-emitting device drive chip and other electronic components, the model of the shift register may preferably be 74HC595D, and the model of the light-emitting device drive chip may preferably be DS2003CMX.

Figure 12:
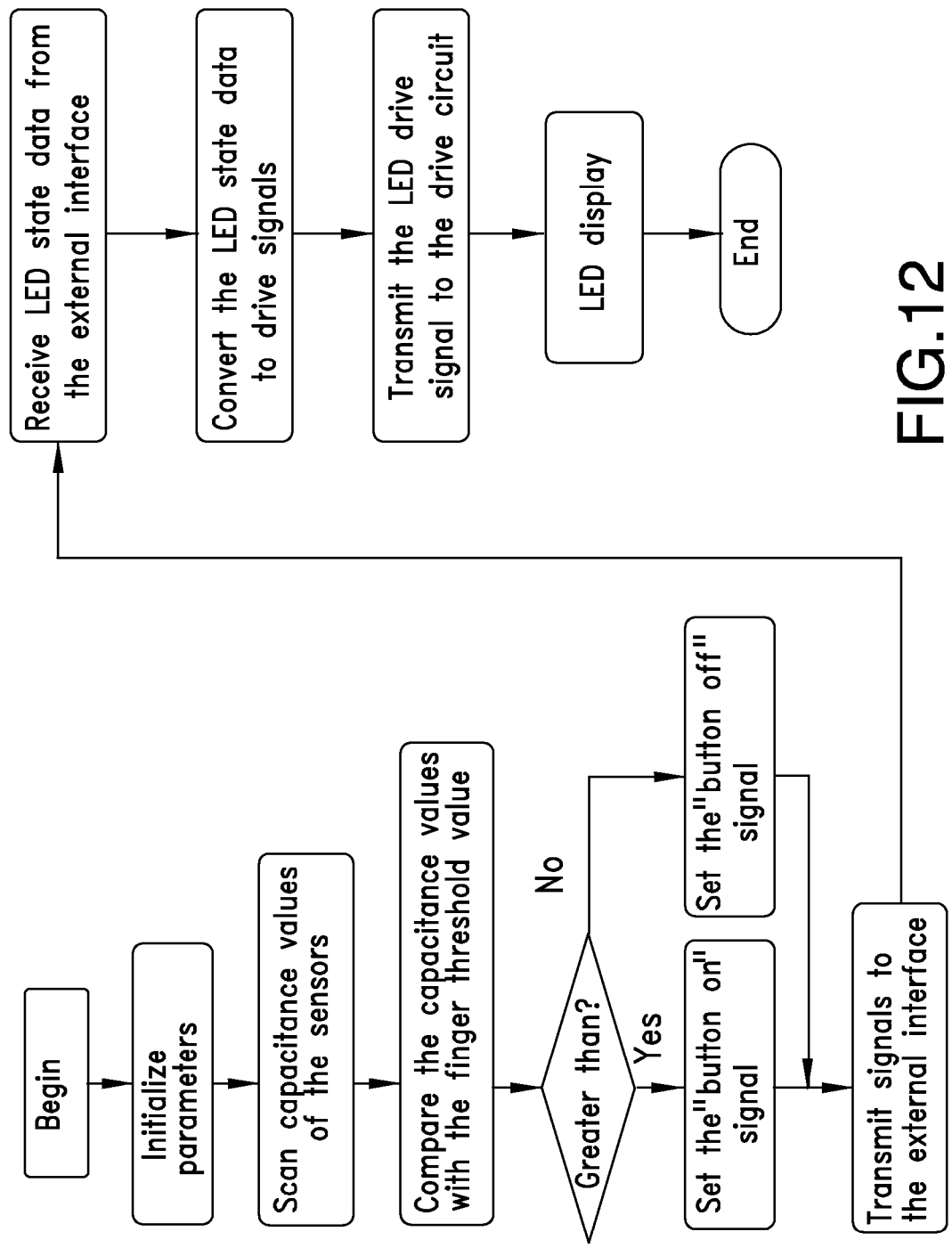
FIG. 12 illustrates a flow chart of the touch control circuit of FIG. 11.
Figure 13:
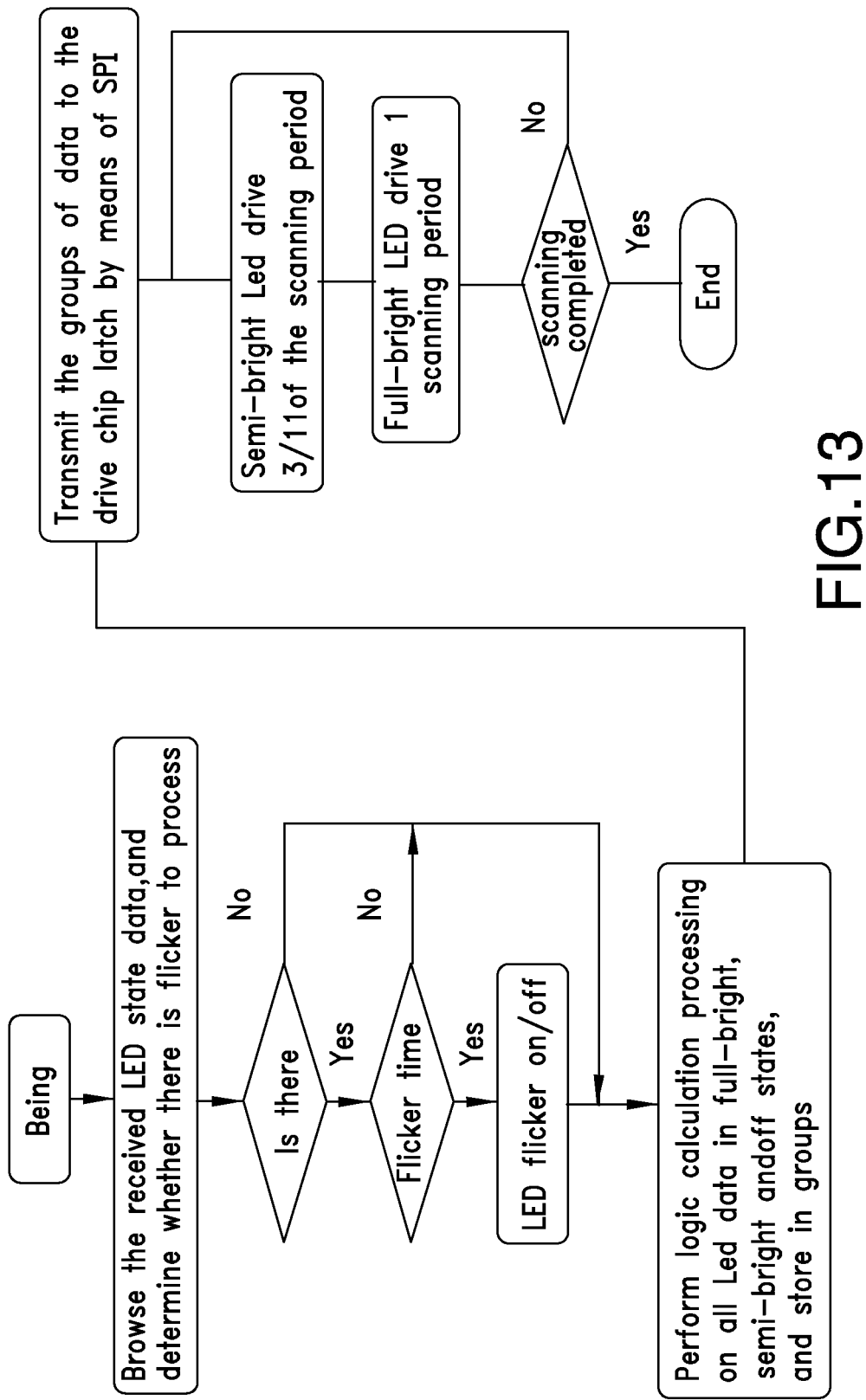
FIG. 13 illustrates a flow chart of the light-emitting control circuit in the touch control circuit of FIG. 11.

Please also refer to FIG. 12 and FIG. 13, the microprocessor control circuit 251 is capable of monitoring in real time the induction signals of each of the above first touch sensor 211, the second touch sensors 214 and the third touch sensor 216 (corresponding to the capacitance values of the touch sensors in the present embodiment), comparing the same with a set threshold value so as to determine the switch state of the function buttons that the touch sensors correspond to, respectively, and transmitting the switch state signals to an external interface to drive the washer to perform corresponding operations. Moreover, the microprocessor control circuit 251 is capable of receiving LED display state control signals transmitted from the external interface, and then converting the same to drive signals and then transmitting to the light-emitting device control circuit 252. The light-emitting device control circuit 252 receives signals transmitted by the microprocessor control circuit 251, and accurately drives each corresponding light-emitting device based on the signal logic into different light-emitting states: full bright, semi bright, and off, thereby displaying different working states on the main panel 1.

In practical applications, when an operator's finger approaches from above one of the first touch display areas 111 on the main panel 1, the induction signal of the first touch sensor 211 underneath this first touch display area 111 (corresponding to the capacitance value of the touch sensors in the present embodiment) will begin to increase gradually and transmit said induction signal to the touch control circuit 25, when said touch control circuit 25 detects that the capacitance value of said first touch sensor 211 exceeds a set threshold value (at this moment, the finger has touched or is very close to the surface of this first touch display area 111), said touch control circuit 25 may correspondingly control the first light-emitting device 212 at the side edge of said first touch sensor 211 to change from the initial semi-bright light-emitting state to the full-bright light-emitting state, thereby changing the backlight state of the function display pattern on the first touch display area 111 of the main panel 1 and simultaneously notifying the washer of said operation information for corresponding operation.

It should be particularly noted that in the present preferred embodiment, when the operator's finger moves to an area in the combined touch area 114, the capacitance values of several second touch sensors 214 in areas close to the finger will change and transmit said induction signals to the touch control circuit 25, said touch control circuit 25 then performs a totaling computation on these induction signals, and calculates the neighboring combination with the biggest change of induction signal through an induction detection algorithm, thereby determining exactly above which second touch sensor 214 the touch position of the finger is at. The present preferred embodiment is further capable of determining whether the touch position is above the bordering edge or above the central portion of that second touch sensor 214, and then controlling the second light-emitting device 215 underneath the sub-display unit 118 in the combined display area 115 that corresponds to the touch position to change from the initial first light-emitting state that is unselected (corresponding to the semi-bright light-emitting state in the present embodiment) to the second light-emitting state that is selected (corresponding to the full-bright light-emitting state in the present embodiment), while other second light-emitting devices 215 underneath the unselected sub-display units 118 are still in the semi-bright light-emitting state; such a design enables each physical second touch sensor 214 to correspond to two corresponding sub-display units 118 in the combined display area 115 (each sub-display unit 118 corresponding to a specific washing mode), therefore, the 8 second touch sensors 214 in the combined touch area 114 may correspond to sixteen sub-display units 118 in the combined display area 115, thereby reducing the deployment density of the second touch sensors 214 and consequently reducing the manufacturing difficulty and manufacturing cost. Of course, other induction detection algorithms may also be used to establish different mapping relationships between the second touch sensors 214 and the sub-display units 118, for example: the initial value may be that a random sub-display unit 118 is in the full-bright light-emitting state, whenever the finger passes through a second touch sensor 214, it is automatically switched that the next neighboring sub-display unit 118 turns to the full-bright light-emitting state, while the previous sub-display unit 118 returns to the semi-bright state. As a result, when an operator's finger rotates along the combined touch area 114, the second light-emitting devices 215 of the selected corresponding sub-display units 118 in the combined display area 115 will sequentially change to the full-bright state, while the second light-emitting devices 215 of the unselected sub-display units 118 will sequentially return to the original semi-bright state, and this operation interface enables the operator to conveniently switch and select among a variety of different washing modes. When the operator's finger falls in the touch display area for function execution 116 at last, the third touch sensor 216 can sense the proximate signal of the operator's finger and transmits said induction signal to said touch control circuit 25 for controlling the third light-emitting devices 217 to turn into the full-bright light-emitting state, and at the same time, the washer may be activated to wash according to the selected washing mode. Such a cool operation interface is very flexible, is advantageous for providing better user experience and thereby improving the level of household electrical appliances, and has very convenient operations.

Said main circuit module 3 comprises a second circuit board 31, a cable connector 32 and a display module 33 that is disposed with said first circuit board 21 side by side.

The second circuit board 31 is disposed underneath the notch 213 of the first circuit board 21, leading to a height gap with the first circuit board 21, as a result, they are spaced apart spatially, and the second circuit board 31 may be electrically connected to the first circuit board 21 via a connector (not shown). In the present preferred embodiment, said touch control circuit 25 is preferably disposed on the second circuit board 31. Through the separation of the two circuit boards 21 and 31, these first touch sensor 211, second touch sensors 214 and third touch sensor 216 may be isolated spatially from the touch control circuit 25, such that the interference from the electromagnetic radiation emitted by the touch control circuit 25 and other power components on the second circuit board 31 on the first touch sensor 211, the second touch sensors 214 and the third touch sensor 216 on the first circuit board 21 can be reduced, thereby preventing the capacitance values of the touch sensors from fluctuating to produce wrong induction signals, which in turn could make the touch control circuit 25 to carry out misjudged operations.

One end of the cable connector 32 may be directly welded to the second circuit board 31, and the other end may be connected to other circuits in the washer, for example, connected to the motor control panel in the washer, thereby transmitting relevant operation signals captured by the touch control circuit 25 to the main control circuit of the washer to perform operational control on the motor.

The display module 33 is installed correspondingly underneath the display window 112 on the base 11 of the main panel 1. The display module 33 may a LED light-emitting module or a LCD light-emitting module, which indicates the washer's working state by displaying a variety of light-emitting patterns. The display module 33 is disposed at the notch 213 on one side of the first circuit board 21 side by side. Preferably, the second circuit board 31 is directly welded to the bottom surface of the display module 33, while electronic components that form the touch control circuit 25 are disposed on the bottom surface of the second circuit board 31 that is away from the main panel 1, and a mutually departing structure that is designed for the touch control circuit 25 on the second circuit board 31 and the touch sensors on the first circuit board 21 can further reduce the interference of the touch control circuit 25 on the touch sensors. By combining the display module 33 that has a higher display density and the light-emitting touch module 2 having touch functions but a lower display density, on the other hand, it is beneficial for improving the button layout of the touch panel and lowering the cost.

Compared to the prior art, by disposing the light reflecting parts 23 underneath said light guiding parts 22, the touch panel according to the Present Disclosure may reflect the light diffused downward from the bottom surface of the light guiding parts 22 by the light-emitting devices 212, 215 and 217 back to the light guiding parts 22, which is further projected upward from the display patterns on the main panel 1, thereby improving the brightness of the patterns of the first touch display areas 111, the combined display area 115 and the touch display area for function execution 116 without increasing the power consumption of the light-emitting devices 212, 215 and 217, which is beneficial for improving the visual effect of the touch panel, as well as energy saving and environmental protection.

While a preferred embodiment of the Present Disclosure is shown and described, it is envisioned that those skilled in the art may devise various modifications without departing from the spirit and scope of the foregoing Description and the appended Claims.

What is claimed is:

1. A touch panel, the touch panel comprising:
a main panel, the main panel including a base, a plurality of side panels extending downward from the base, a plurality of display patterns disposed on the base, and a singular opening disposed therein, the base and the side panels defining a chamber, the opening being waterproof; and
a light-emitting touch module disposed underneath the main panel and within the chamber, the light-emitting touch module including:
a first circuit board, the first circuit board including a plurality of touch sensors, a plurality of light-emitting devices and a plurality of light guiding parts, each light guiding part being attached to a side edge of one light-emitting device to evenly project the light emitted from the light-emitting device upward;
a light reflecting part disposed underneath each light guiding part, each light reflecting part reflecting the light emitted from the light guiding part back to the light guiding part, which is further projected upwards toward the display patterns to improve the brightness of the display patterns; and
a spacer, the spacer being disposed between, and in contact with, the main panel and the first circuit board.

2. The touch panel of claim 1, wherein each light reflecting part includes a layer of light reflecting film printed with a light reflecting ink on the first circuit board, attached underneath the bottom surface of one light guiding part.

3. The touch panel of claim 2, wherein each touch sensor is a capacitive touch sensor, and the light reflecting film is printed above the touch sensors.

4. The touch panel of claim 1, wherein the spacer being made of an opaque material.

5. The touch panel of claim 1, wherein the top surface of each light guiding part is a rough cloudy surface, while the bottom surface thereof is a smooth surface.

6. The touch panel of claim 1, wherein the light-emitting touch module further includes a second circuit board and a touch control circuit disposed thereon, the second circuit board being electrically connected to the first circuit board and spaced apart at a distance therefrom, to reduce the electromagnetic interference by the touch control circuit on the touch sensors.

7. The touch panel of claim 6, wherein the light-emitting touch module further includes a display module disposed at one side of the first circuit board, the second circuit board being disposed on the bottom surface of the display module.

8. The touch panel of claim 1, wherein the main panel is further comprises a combined touch area and a plurality of sub-display units corresponding to the combined touch area, each sub-display unit being provided with a corresponding display pattern.

9. The touch panel of claim 4, further including vertically-running holding holes, each holding hole being disposed on the spacer at positions corresponding to the display patterns on the main panel for correspondingly holding one light guiding part.

10. The touch panel of claim 7, wherein electronic components that form the touch control circuit are disposed on the bottom surface of the second circuit board that is away from the main panel.

11. The touch panel of claim 8, wherein the first circuit board includes a plurality of continuously arranged touch sensors correspondingly underneath the combined touch area.

12. The touch panel of claim 11, wherein the light-emitting devices are correspondingly underneath the sub-display units.

13. The touch panel of claim 12, wherein the combined touch area is ring shaped, and the touch sensors corresponding to the combined touch area are continuously arranged on the first circuit board in the rotation direction in a tandem array.

14. The touch panel of claim 13, wherein each touch sensor that the combined touch area corresponds to are capacitive touch sensors, the borderline between two neighboring touch sensors is being dovetail shaped.

* * * * *